UNITED STATES PATENT OFFICE.

WINTWORTH V. LANDER, OF NEWTON, MASSACHUSETTS, ASSIGNOR TO GENERAL INDURATING CORPORATION, OF NEW YORK, N. Y., A CORPORATION OF NEW YORK.

IMPREGNATED MATERIAL.

1,376,553.     Specification of Letters Patent.     Patented May 3, 1921.

No Drawing.     Application filed July 31, 1918. Serial No. 247,664.

*To all whom it may concern:*

Be it known that I, WINTWORTH V. LANDER, citizen of the United States of America, and resident of Newton, in the county of Middlesex and State of Massachusetts, have invented new and useful Improvements in Impregnated Materials, of which the following is a specification.

This invention relates to porous materials impregnated with a composition comprising crude petrolatum or other suitable petroleum residue such as described and claimed in my Patents No. 1,277,322, granted August 27, 1918, and No. 1,278,943, granted September 17, 1918, of which this is in part a continuation.

The substances or materials which are susceptible of impregnation to produce the improved articles embodying the present invention are exemplified by compressed wood-pulp articles, such as pulp-boards, pails, toilet seats, etc., and also by flexible sheet materials such as paper, textiles, paper board, leather board and leather, all of which are characterized by interstitial structure capable of taking up a liquid by capillary absorption. Interstitial or porous structure connotes a degree of structural discontinuity; the impregnation of such a structure with a substance which in whole or in part fills the interstices or pores increases or enhances the structural continuity of the body as a whole, by substituting for the gaseous content of the interstices or pores a viscous or solid content, according to the physical character of the filling material.

One of the main objects of my invention is to render porous or bibulous bodies impervious or resistant to water by reason of the increased or enhanced internal structural continuity imparted to such bodies by my new composition, and this property is common to all such bodies after adequate treatment by my process and composition. In other respects the quality of porous or bibulous bodies so treated is susceptible of variation in response to variation in the proportions of the ingredients of the composition and in the method of treatment with the composition.

The impregnating composition which I employ in producing the improved articles or products claimed herein comprises a petroleum residue and a resin, preferably colophony, dissolved in gasolene or suitable solvent, this composition being described and claimed in my said Patent No. 1,277,322. The preferred species of the genus petroleum residue is crude petrolatum, which is described and claimed in my application Sr. No. 246,663, filed on even date herewith. As described in said application the crude petrolatum is obtained from paraffin-base petroleum such as obtained in Pennsylvania, when refined by the process known as fractional distillation. It has a flash point of approximately 500° F., and melting point of the order of 120° to 130° F., and is a mixture of saturated and unsaturated hydrocarbons. The product comprises olefins, naphthenes and paraffins in amorphorous form, but contains no paraffin as such, that is, no paraffin in crystalline commercial form. Most of the paraffin is removed from the petroleum in the form of paraffin wax before the crude petrolatum is arrived at. Both resin and the crude petrolatum are inherently water-resistant substances; the gasolene constitutes a vehicle or carrier which readily penetrates the pores of a porous body, carrying into it the water-resistant ingredients, and depositing them therein by subsequent volatilization or evaporation.

The functionally valuable characteristics of a carrier of the water-resistant ingredients are, that it shall be a solvent of the said ingredients or a liquid capable of sustaining them in a condition of extension, shall be capable of wetting the substance of which a porous body to be treated is composed, and shall be volatile or evaporable, so as to leave the ingredients carried into the porous or bibulous body, lodged in the pores or interstices of the same after treatment.

I am aware that compositions containing a resin and an asphalt, a resin and paraffin, and an oil dissolved in a volatile carrier, have been suggested for the purpose of impregnating and waterproofing porous bodies such as wood-pulp articles or paper board, and that the function of the volatile carrier in such cases is the same in substance as that of the carrier in my new composition of matter. But none of the proposed compositions of matter, so far as I am informed or have been able to ascertain by observation and experiment, has possessed the range of application, or has been capable of producing the variety of effects, which are characteristic of the composition employed in producing the products herein claimed. Whether the carrier be gasolene or some other volatile or evaporable liquid which may answer the purpose in a measurable degree, or whether common rosin or some other resin be used as the resinous ingredient, the employement of crude petrolatum or other suitable petroleum residue such as described in said applications renders the composition capable of securing new and useful results and susceptible, moreover, of producing a wide variety of results and physical characteristics in product, provided the proportions of the water-resistant ingredients be varied.

A series of practical demonstrations has shown that a composition, characterized by the presence of crude petrolatum and a resin, and introduced by means of a volatile or evaporable carrier is capable of indurating and toughening porous bodies, such as wood-pulp articles, leather or articles made therefrom, or of toughening and rendering pliable materials such as leather or textiles; and in the case of leather particularly, of filling, plumping, refining the grain, increasing softness and pliability, increasing tensile strength, and, generally speaking, so improving the physical characteristics of leather as to raise its grade and market value. Cloth of all kinds and articles made therefrom can be effectively waterproofed by means of this composition, without suffering any detriment or serious loss of pliability, and with very little increase in weight. If, on the other hand, increase in weight is a desideratum, the composition may be varied in proportions of ingredients to produce this result.

The general rule to be derived from my demonstrations and observations is that in order to stiffen and indurate porous material, the resinous ingredient should be increased in proportion; while in order to produce soft and pliable products, the crude petrolatum should increase proportionately. Greater or less concentration of both of these ingredients in the solution in the volatile or evaporable carrier will make the characteristic effect more or less marked in the impregnated product.

The mode of compounding this composition of matter and preparing it for introduction into a porous or bibulous body, which I have adopted in practice and believe to be the best, is as follows: First, dissolve or "cut" the resinous ingredient in the volatile solvent or carrier. Secondly, add the crude petrolatum and heat the mixture. For such purposes as impregnation and induration of wood-pulp articles, or the stiffening and toughening of pliable materials, I have found the following proportions and operations to be suitable: Mix rosin and gasolene in the proportions of four pounds of rosin to one gallon of gasolene (approximately six pounds). When the rosin has been completely dissolved or "cut" by the gasolene, pour off the clear liquid from such sediment as may be present, or filter out the sediment. Then add the crude petrolatum to the gasolene-rosin solution, using about three pounds of crude petrolatum to the gallon of solution, and heat the mixture, when the crude petrolatum will also go into solution. The final proportions of the composition made according to this formula will be, approximately, four pounds of rosin, three pounds of crude petrolatum and six pounds of gasolene. If it is intended to produce softer and more pliable articles, as of leather or textile material, the proportions of rosin and crude petrolatum will be varied; the more preponderant the crude petrolatum, the softer and more pliable will be the treated material. Different weights of filler per square or cubic inch of material treated will be obtained by variations in the dilution of the dissolved materials (crude petrolatum and resin) in the volatile carrier.

Porous or bibulous material to be treated with this preparation of the composition may be immersed in it, or coated or sprinkled with it, according to the degree of impregnation desired. Preferably the materials to be treated will be immersed in the preparation of the composition, and preferably also the carrier-liquid and composition should be used hot, since heat makes the composite liquid thinner and more promptly penetrative. If desired, and when the character of the porous material permits, the material to be treated may be heated also before immersion. The carrier with the composition penetrates the porous body immersed in it, expelling air from the pores and interstices, and when impregnated to the desired degree, the porous body is removed from the carrier-bath and dried, either with or without artificial heat, as may be determined on. The volatile carrier is dissipated, leaving the intimate mixture or composition of crude petrolatum and resin lodged and fixed in the pores of the material. These, according to the proportions of the impregnating substances, their quantity per unit of space, and also according to the physical pecularities of the porous body itself, impart to the product physical characteristics which will be herein more particularly illustrated by examples. In all cases, however, the impregnated body will be rendered water-proof or water-resistant.

Leather products embodying the present invention deserve particular description, since they have properties of marked superiority. I am informed that although many devices have been sought and some resorted to for rendering leather waterproof, that is, impervious to water in the sense that a rubber sheet is impervious, no permanently waterproof leather has yet been produced. Fillers or coatings, in themselves impervious to water, such as patent leather finish, are well known; but these, while protective as long as they persist unbroken, do not render the leather itself water-resistant or waterproof. Greasy or oily fillers temporarily impart water-resistant properties to leather, but these work out of the leather sooner or later, and leave it susceptible to water-penetration as before.

By impregnating the pores of leather with the composition of crude petrolatum and a resin, according to my invention, the leather itself, as a sheet of material, becomes permanently waterproof. The crude petrolatum prevents the leather from becoming stiff or brittle, since this filling material is in itself a pliable and softening agent. Alone, it would soon work out of the leather, rendering the surface greasy and liable to spot or grease other objects, and leaving the leather itself hardly, if at all, more waterproof than originally. The presence of the resin holds and fixes the composition in the pores of the leather where it is deposited, as by the evaporation of the solvent or carrier; a resin alone, if deposited in the pores of leather would render the product stiff and brittle; the qualifying presence of crude petrolatum prevents this.

The apparatus which I preferably employ in producing the products claimed herein is described and claimed in my application Sr. No. 247,662, filed on even date herewith. This apparatus comprises a deep tank partially filled with the impregnating composition and arranged to be heated to a temperature such that the upper portion of the tank is filled with vapor of the gasolene or other solvent. The hide or skin or other material is dipped into the hot solution and then withdrawn through the vapor in the upper portion of the tank. As the hide or skin enters the composition the air is driven out of the pores and the composition solution strikes in, thoroughly impregnating the leather. As the leather is drawn out of the composition it is bathed in the vapor which occupies the upper part of the tank over the liquid level, and this vapor-washing removes from the surface of the leather all streaks of greasy material which otherwise might remain and degrade the leather. This vapor bath degreases the leather to a slight degree, just enough to clean its surface thoroughly. The leather is then hung up to dry, either in the open, or in the drying room.

The physical character of the product depends on the selection of proportions of ingredients in the treating composition, and almost any desired variation in result can be obtained after experience with, and manipulation of the composition. For instance, to make an improved waterproof leather, use equal parts of crude petrolatum and rosin, and an amount of gasolene which weighs about eighty per cent. of the combined weight of the other two ingredients. If the gasolene is of specific gravity sixty, heat it to 200° F. in the treating tank and immerse the leather about fifteen seconds. The product, after drying, will be firmer, harder, and less flexible than the untreated leather, will be permanently waterproof, much more resistant to wear, and has a surface susceptible of receiving a high polish.

If leather for gloves or light shoe uppers is to be produced, say from calfskin, use to each gallon of gasolene two pounds of rosin and three pounds of petroleum residue, and treat the leather with this composition as hot as 200° F. or higher. The leather usually need not be immersed longer than ten seconds. The product is well plumped, the quality and feel of the grain refined and improved; the leather is soft and flexible, of higher tensile strength than originally, and improved in grade. It is, like all products thus treated with my composition, completely waterproof. This treatment does not seem to affect coloring matter in the leather, but imparts improved character to all kinds of leather without incidental detriment. Cemented laminated leather belting can be advantageously treated with my composition which imparts the waterproof character to the belting, increases its tensile strength, decreases its liability to stretching, and gives it a traction surface which requires little or no belt-dressing.

The vapor bath given to leather on emerging from the liquid composition in apparatus such as above described, is particularly important and beneficial, since it prevents any greasy streaks or exudations from remaining on the surface of the leather.

As to the treatment of other flexible materials than leather, I have waterproofed cloth garments, tent cloth and miscellaneous textile articles, by giving them a single treatment in all essentials like that above prescribed for flexible glove or upper leather. I have also treated wood pulp articles, using a composition of four pounds of rosin and three pounds of crude petrolatum to the gallon of gasolene, immersing the wood-pulp articles in the composition at a temperature about 200° F., leaving them immersed long enough to insure thorough penetration. The product when dry is highly indurated, tough and takes a high polish. The complete waterproof character of the product adapts such impregnated wood-pulp to a variety of uses.

The articles of wood-pulp will be molded to their desired and intended shape before impregnation.

As a general rule, the higher grades of gasolene, such as commercial 70 to 75 specific gravity gasolene, form a composition which need not be heated to so high a point for good results in treatment of porous bodies. With such gasolene, the temperature need not be much above 150° F.

The time of immersion of a body to be impregnated by my new composition will depend on the degree of penetration or impregnation desired, the thickness of the body, the degree of fineness of its pores and interstices, the temperature of the composition, and the degree of concentration of soluble ingredients therein. By variations in these factors almost any conceivable character or degree of impregnation can be obtained.

Both resin and crude petrolatum being inherently water-resistant, a compound of the two, made by heating them together, either with or without a diluent, solvent or carrier, is likewise water-resistant. When the pores or interstices of a porous or bibulous body are impregnated by this compound, the function of the resin is, in part, to retain the composition in the pores or interstices; the crude petrolatum would of itself tend to work out of the pores or interstices. The resin prevents this and makes the composition, with its greasy or lubricant component, stick in the body. The function of the crude petrolatum, in part, is to lubricate, render pliant and tractable, or to toughen rather than stiffen, a body, which if impregnated with a resin alone, would be stiff and brittle. The virtues or qualities of one ingredient modify the tendencies of the other. The composition, while partaking of the qualities of resin and petroleum residue, is neither of these, nor is it a mere aggregation of the two. Each performs its function in conjunction with that of the other; the joint result is more than, and different from, an aggregate of the separate results which might be produced by the use of each separately.

A composition of these two ingredients may be prepared simply by heating the components together, and each composition, when fluid and hot, will in a measure penetrate the pores or interstices of a porous or bibulous body, and will thus impregnate it. But such a liquid composition is not so capable of wetting solid porous bodies as is a liquid such as acts as a solvent or diluent for the impregnating components. Capillary attraction of the solid body for a liquid is a physical phenomenon which, as in the case of gasolene, may be taken advantage of to secure quick impregnation of a porous body with substances which of themselves possess little or inferior capillary attraction for the body itself. Hence the employment of a liquid diluent or carrier, having capillary attraction for the porous body and being therefore capable of promptly wetting it, is a characteristic of the preferred method above described. Should the impregnation of a porous body by the impregnating substances themselves, in a liquid state, be resorted to, the surface of the body may be cleansed or washed with a solvent of the impregnating materials either in liquid or vaporous condition, if it be desired to remove the greasy and resinous substances from the surface.

The method above described and the effect of impregnation of miscellaneous porous or bibulous bodies with the new composition of matter characterized by crude petrolatum and a resin in intimate association with each other, whatever be the specific peculiarity of the porous or bibulous body, or whatever the proportions of the ingredient elements of the composition has this persistent characteristic or quality, that by it there is produced in the porous or bibulous body an internal structural continuity of higher degree than is possessed by the body prior to its treatment with the composition. This improved or enhanced continuity of substance is responsible for the imperviousness to water which results from impregnation, in conjunction with the water-repellent or resistant properties inherent in the impregnating composition itself. Enhanced continuity is consistent, also with the increase in toughness produced in bodies indurated with the composition in which resin predominates, as well as with the improved smoothness and pliability of other bodies, impregnated with the composition in which the lubricant crude petrolatum predominates.

I claim:

1. Porous material having its porosities impregnated with a composition composed essentially of crude petrolatum and a resin.

2. Porous material having its porosities impregnated with a composition composed essentially of crude petrolatum and colophony.

3. An article of manufacture comprising leather impregnated with a composition composed essentially of crude petrolatum and a resin.

4. An article of manufacture comprising leather impregnated with a composition composed essentially of crude petrolatum and colophony.

5. An article of manufacture comprising leather impregnated with a non-paraffinic composition composed essentially of crude petrolatum and a resin.

6. An article of manufacture comprising leather impregnated with a non-paraffinic composition composed essentially of crude petrolatum and colophony.

7. An article of manufacture comprising porous material impregnated with a composition comprising crude petrolatum.

8. An article of manufacture comprising porous material impregnated with a composition comprising crude petrolatum and a resin.

9. An article of manufacture comprising porous material impregnated with a composition comprising crude petrolatum and colophony.

10. An article of manufacture comprising porous material impregnated with a composition comprising crude petrolatum in major part.

11. An article of manufacture comprising porous material impregnated with a composition comprising crude petrolatum and a resin in which the former predominates.

12. An article of manufacture comprising leather impregnated with a composition comprising crude petrolatum.

13. An article of manufacture comprising leather impregnated with a composition comprising crude petrolatum and a resin.

14. An article of manufacture comprising leather impregnated with a composition comprising crude petrolatum and colophony.

15. An article of manufacture comprising leather impregnated with a composition comprising crude petrolatum in major part.

16. An article of manufacture comprising leather impregnated with a composition comprising crude petrolatum and a resin, the amount of crude petrolatum being at least of the order of the amount of resin.

17. An article of manufacture comprising leather impregnated with a composition comprising crude petrolatum and a resin in which the former predominates.

18. An article of manufacture comprising porous material impregnated with a nonparaffinic composition comprising crude petrolatum.

19. An article of manufacture comprising porous material impregnated with a nonparaffinic composition comprising crude petrolatum and a resin.

20. An article of manufacture comprising porous material impregnated with a nonparaffinic composition comprising crude petrolatum and colophony.

21. An article of manufacture comprising porous material impregnated with a nonparaffinic composition comprising crude petrolatum in major part.

22. An article of manufacture comprising porous material impregnated with a nonparaffinic composition comprising crude petrolatum and a resin in which the former predominates.

Signed by me at Boston, Massachusetts, this 25th day of April, 1918.

WINTWORTH V. LANDER.